Jan. 7, 1941.      R. A. TROMAN      2,227,609
TENSIONING DEVICE FOR GUY LINES
Filed Sept. 12, 1939      2 Sheets-Sheet 1
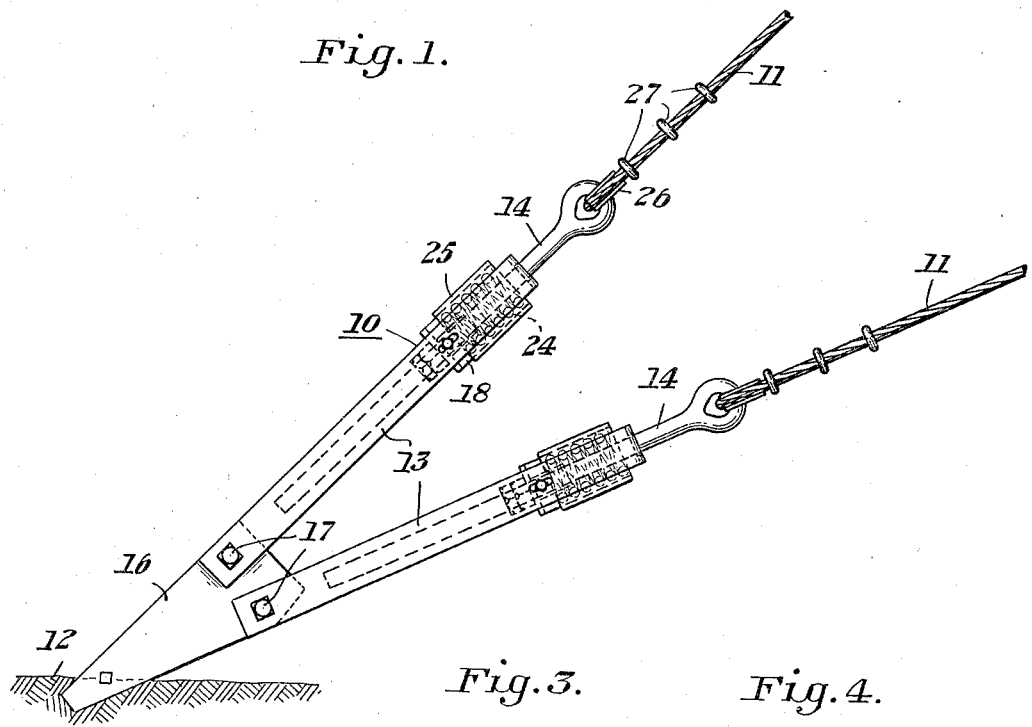
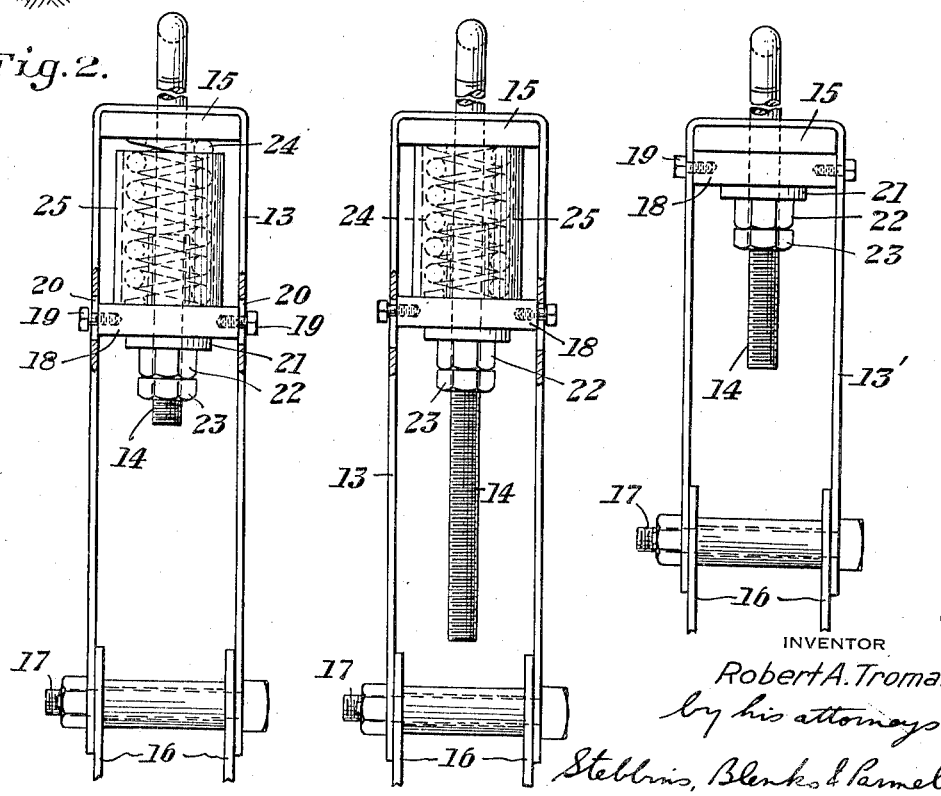
INVENTOR
Robert A. Troman
by his attorneys
Stebbins, Blenko & Parmelee Jan. 7, 1941. R. A. TROMAN 2,227,609
TENSIONING DEVICE FOR GUY LINES
Filed Sept. 12, 1939 2 Sheets-Sheet 2
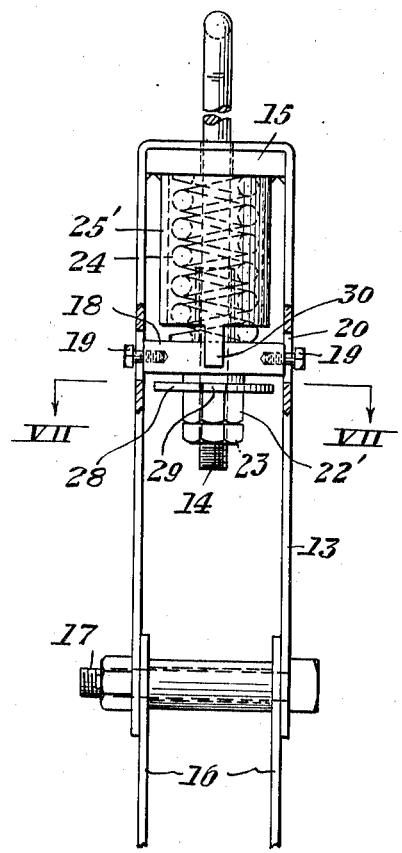
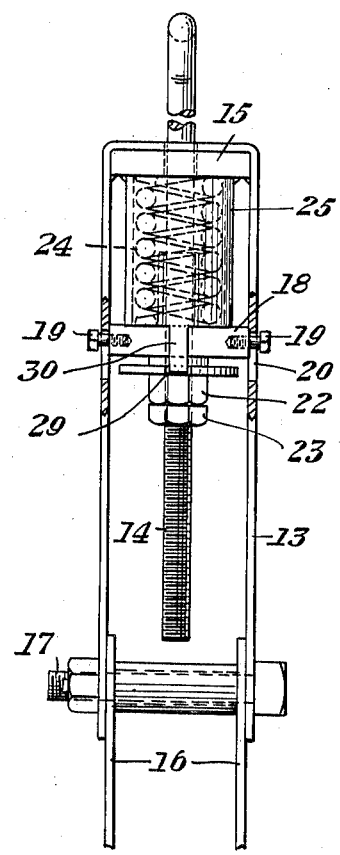
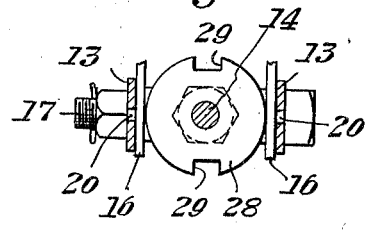
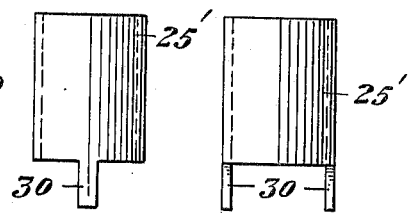
INVENTOR
Robert A. Troman
by his attorneys
Stebbins, Blenko & Parmelee Patented Jan. 7, 1941

2,227,609

UNITED STATES PATENT OFFICE 2,227,609

TENSIONING DEVICE FOR GUY LINES

Robert A. Troman, Pittsburgh, Pa., assignor to Blaw-Knox Company, Pittsburgh, Pa., a corporation of New Jersey Application September 12, 1939, Serial No. 294,490

6 Claims. (Cl. 287—59)

This invention relates to a tensioning device and, in particular, to a device adapted to tension the guy lines of a vertical tower or mast.

Guy lines are necessary for bracing certain types of structures such as vertical towers or masts, a common example being the conventional radio broadcasting antenna. Such guy lines are preferably maintained under a predetermined tension, in order to stabilize the mast or tower. Lateral forces on the tower such as those created by wind pressure are resisted by the tension in the guy lines, the tension in the guy lines on the windward side increasing in proportion to the wind pressure. In order to prevent failure of the guy lines under the maximum tension which is equal to the initial tension plus that necessary to oppose the lateral forces on the mast, it is desirable that the guy lines be subjected to the proper initial stress but no more.

Guy lines are usually subjected to pre-stretching before installation but even so are susceptible to further stretching in service. This makes it necessary to take up any slack resulting from stretching and thereby restore the desired initial tension. Various expedients have been used heretofore for determining the tension in guy lines but all such expedients with which I am familiar have been attended by numerous disadvantages.

It is the object of this invention, therefore, to provide means whereby a workman may subject a guy line to the proper initial tension and also to enable an inspector to determine by a glance whether a guy line is under proper tension or requires further tensioning. The invention further provides means for preventing changes in the setting of the tensioning means once it has been properly adjusted.

In a preferred form, the invention comprises a pair of cooperating elongated members, one of which is adapted to be secured to a fixed support and the other to a guy line. While the device may be installed at any point in a guy line, it is preferably installed near the ground to facilitate inspection and readjustment when necessary. Spring means cooperating with the elongated members transmits to one of them the tension applied to the other. The invention includes means for taking up one of the members relative to the other, to apply tension to the guy line and stress the spring means. It further includes means for limiting the yielding of the spring means whereby to indicate that the desired tension has been established in the guy line.

In a modified form, I provide means for preventing changes in the adjustment of the tensioning device once it has been properly adjusted until the tension in the guy line has been reduced sufficiently to make such adjustment desirable. The device may also be employed without the spring means in the same manner as an ordinary turnbuckle.

The aforementioned preferred embodiment and modification are illustrated in the accompanying drawings and the following detailed description should be read with reference thereto.

In the drawings,

Fig. 1 is a partial elevation showing the tensioning device installed at the lower end of a pair of guy lines;

Fig. 2 is a side elevation showing the parts of the tensioning device in initial position;

Fig. 3 is a similar view showing parts in the positions they assume when the guy line has been properly tensioned;

Fig. 4 is a similar view showing a modified device for use instead of a turnbuckle;

Fig. 5 is a view similar to Fig. 2 showing a different form of the invention in the initial position;

Fig. 6 is a similar view showing the parts in the positions they assume when the guy line is properly tightened;

Fig. 7 is a sectional view taken substantially along the plane of line VII—VII of Fig. 5;

Fig. 8 is a side elevation of a detail; and

Fig. 9 is another side elevation thereof taken from a position at right angles to that from which Fig. 8 is seen.

Referring now in detail to the drawings, the tensioning device indicated generally at 10 is adapted to be connected in a guy line 11. Conveniently, the tensioning device may be attached to the lower end of the line and in turn secured to a fixed abutment illustrated diagrammatically at 12. It will be understood, however, that the tensioning device may as well be inserted between two sections of a guy line extending, respectively, to the mast and a fixed abutment.

The device 10 comprises an elongated holding member preferably in the form of a yoke 13 made of metal strap bent to suitable shape, and a take-up member 14 preferably in the form of a threaded rod or eye-bolt. A seating block 15 is preferably welded to the inner end of the yoke 13 and the bolt 14 passes through holes in the yoke and block.

The yoke 13 is secured to the abutment 12 by plates 16 suitably anchored therein and through bolts 17.

The yoke 13 constitutes a housing or frame partially enclosing the bolt 14. A slide block 18 is disposed within the yoke 13 and has guided movement longitudinally thereof. Screws 19 threaded into tapped holes in the edge of the block 18 traverse longitudinal slots 20 formed in the yoke 13. A bearing washer or collar 21 on the bolt 14 engages the block 18 and may be adjusted along the bolt by an adjusting nut 22. A lock nut 23 is provided to hold the nut 22 in adjusted position. A compression spring 24 is disposed about the bolt 14 between the blocks 15 and 18. A spacer sleeve 25 encloses the spring 24. As shown in Fig. 2, the spacer sleeve is somewhat shorter than the spring 24 when the latter is fully extended.

The guy line to be stressed, such as that shown at 11, is attached to the bolt 14 as by passing it through the eye of the bolt and around a thimble 26 inserted therein. The end of the cable is then bent back on and secured to itself by clips 27. If the mast is braced by a single set of three guys, the tensioning device need be installed in only one of them and any suitable form of take-up may be used in the other lines. This is because the tension in all the guys is substantially equal so that it is only necessary to tension one guy line to the desired extent to make sure that all the lines are similarly tensioned. Fig. 1 shows an installation in which two sets of guy lines are employed, in the known manner. If more than three guy lines are connected to any point on the mast, a correspondingly greater number of tensioning devices should be employed. If four guy lines are used, for example, tensioning devices should be installed in two adjacent lines. It is not necessary that the tensioning devices for both sets of guy lines be secured to the same anchorage as indicated in Fig. 1, although this is sometimes convenient since it permits the adjustment of both sets of lines at a common point.

Assuming that a mast is braced by a single set of three guy lines secured to a common point along the height of the mast, that all the guy lines are so adjusted as to be slightly slack, and that the nuts 22 and 23 have been backed off toward the end of the bolt 14, the parts of the tensioning device 10 will occupy the positions shown in Fig. 2, i. e., the yoke and bolt will be in extended relation. With the parts in such positions, the spring 24 exerts a pressure equal to the tension in the guy line whatever it may be, and the spring is designed and tensioned accordingly.

When it is desired to raise the tension in the guy lines to the desired normal value, it is only necessary to turn up the nuts 22 and 23 on the bolt 14, thus telescoping the bolt into the yoke. The bolt is provided with a relatively long shank to provide ample take-up. The tension exerted on the bolt 14 by the line 11, of course, is transmitted by the collar 21 and slide block 18 to the spring 24 and from the latter to the yoke 13. As the tension in the guy line increases, therefore, the spring 24 contracts correspondingly. The spring 24 and sleeve 25 are so designed that the spring will exert a force equivalent to the desired initial tension in the line 11 when the spring has been compressed to a length equal that of the sleeve 25. This condition is illustrated in Fig. 3. By virtue of this construction, a workman adjusting the nuts 22 and 23 on the bolt 14 need only take them up until the spring is compressed so that the sleeve abuts firmly on blocks 15 and 18, providing a "solid" coupling which transmits tensile stress without changing its length. He is thus able to determine exactly how far to adjust the nuts and when they are properly adjusted, the tightening of the lock nut insures the maintenance of the desired setting. As the spring is compressed, of course, the block 18 slides up on the yoke 13.

The construction described possesses the further advantage that should the guy line stretch in service, the resulting reduction in the tension therein will permit expansion of the spring 24 leaving a visible gap between the sleeve 25 and the block 15. By this means, an inspector may readily determine whether the tension in the guy lines has been reduced below the desired value, by stretching. A further advantage of the construction is that after adjustment of the device as explained, any tension existing in the guy line is transmitted directly through the bolt 14, sleeve 25 and yoke 13 to the stationary abutment. In other words, there is no "give" in the tensioning device after it has once been set up.

By a slight modification, the tensioning device is adaptable for taking the slack out of guy lines other than those in which the device as already described is installed. This modification is shown in Fig. 4. As there shown, it is similar to the form of the invention already described except that the spring 24 and sleeve 25 are omitted, a yoke 13' being provided with a seating block 15 through which the bolt 14 extends. The block 18 is held in fixed position by screws 19 instead of being slidable on the yoke 13'. In other respects, the modification is similar to the tensioning device. It will be understood, of course, that the former is adapted to be substituted for the ordinary turnbuckle but does not give any indication of the correctness of the tension in the guy line.

A further modification is illustrated in Figs. 5 through 9. This modification is similar in general to that shown in Figs. 1 through 3 and corresponding parts are designated by the same reference numerals. The principal difference between the standard form and the modified form is that the adjusting nut 22' of the latter has a flange 28 welded thereto provided with diametrically opposed notches 29 and that the sleeve 25' has depending lugs 30 adapted to enter the notches 29 when the bolt 14 is taken up to an extent such that the spring 24 is compressed so that both the blocks 15 and 18 abut the sleeve 25'. The diameter of the sleeve 25 is such that the lugs 30 clear the block 18.

Fig. 5 illustrates the initial positions of the parts. As the bolt 14 is taken up by adjustment of the nut 22', the spring 24 is gradually compressed. The lugs 30 are of such length that they are engaged by the flange 28 of the nut 22' just before the spring is compressed to its final length, as determined by the length of the sleeve 25' (exclusive of the lugs 30). After such engagement, further slight rotation of the nut causes the lugs 30 to snap into the notches 29 under the pressure of the spring. It will be apparent that no more than a half revolution of the nut is required to produce this result after the initial engagement of the lugs with the flange.

When the parts have been thus positioned as shown in Fig. 6, the lugs 30 prevent rotation of the nut 22' in either direction. This accomplishes a two-fold result. In the first place, it prevents excessive tensioning of the guy line, since it imposes a positive limit upon the amount of take-up it is possible to effect. At the same time, it prevents the tension from being released by malicious tampering, for example. The lock nut 23 serves in the modified form merely to prevent the bolt 14 from swiveling in the yoke.

Should the tension in the guy line be released as by stretching of the line, the spring 24 will expand and move the bolt 14 so that the flange 28 on the nut 22' is beyond the reach of the nut 30. Under these conditions, the nut may be readjusted to restore the desired normal tension.

It will thus be apparent that the modified form of the invention is characterized by all the advantages of the standard form in addition to those just mentioned. In both forms of the invention, the spring is never subjected to tension in excess of the desired initial tension in the guy line. This may be carried by a relatively light and inexpensive spring. For this reason, the cost of the tensioning device is not materially greater than that of an ordinary turnbuckle of similar capacity. The modified form is particularly desirable because it prevents overtensioning, to which the workman is always tempted, to allow for stretching. This is objectionable, however, since an excessive initial stress means that the guy lines will be considerably over-stressed when the mast is subjected to the horizontal forces for which the guy lines are designed.

Although I have illustrated and described but a preferred form and modification of the invention, it will be understood that changes in the construction and arrangement of the parts may be made without departing from the spirit of the invention or the scope of the appended claims.

I claim:

1. A tensioning device comprising a yoke, a take-up rod extending thereinto, a bearing collar on the rod, means for moving the collar on the rod, a spring bearing on said collar and yoke so as to be stressed by tension on the rod, stop means limiting the yielding of said spring, and means operating when said stop means becomes effective, to lock said collar moving means.

2. A tensioning device comprising a yoke, a take-up rod extending thereinto, a bearing collar on the rod, a nut threaded on said rod for moving the collar on the rod, a spring bearing on said collar and yoke so as to be stressed by tension on the rod, stop means limiting the yielding of said spring, and locking means for said nut, said locking means being effective after a predetermined yielding of said spring.

3. A tensioning device comprising a yoke, a take-up rod extending thereinto, a bearing collar on the rod, a nut threaded on said rod for moving the collar on the rod, a spring bearing on said collar and yoke so as to be stressed by tension on the rod, stop means limiting the yielding of said spring, and locking means for said nut on said stop means, rendered operative when said stop means becomes effective.

4. A tensioning device comprising a yoke, an eye-bolt extending into the yoke, a bearing block in said yoke through which said bolt extends, a compression spring and a sleeve on said bolt between said block and the yoke, said sleeve being dimensioned to limit yielding of said spring after an initial compression thereof, a nut on said bolt, and locking means on said sleeve cooperating with the nut when the spring has been compressed to the limit permitted by said sleeve.

5. A tensioning device comprising a yoke, an eye-bolt extending into the yoke, a bearing block in said yoke through which said bolt extends, a compression spring and a sleeve on said bolt between said block and the yoke, said sleeve being dimensioned to limit yielding of said spring after an initial compression thereof, a flanged nut on said bolt, and a lug on said sleeve cooperating with the nut flange when said spring has been compressed to the limit permitted by said sleeve.

6. A device for taking the slack out of guy lines comprising a yoke having a portion adapted to be secured to an anchorage, an eye-bolt extending through said yoke, to which a guy line may be secured, said bolt being normally in extended relation to said yoke but adapted to be telescoped thereinto far enough to remove slack from the guy line, a nut threaded on the eye-bolt for telescoping the eye-bolt into the yoke, a bearing block engaged by the nut, a spring engaging the yoke and block whereby telescoping movement of the bolt into the yoke stresses said spring, and a rigid, elongate member extending between the block and yoke to limit compression of the spring.

ROBERT A. TROMAN.